June 4, 1968                    J. R. WILLSON                    3,386,655
CONTROL SYSTEM FOR AN OVEN OR THE LIKE
Original Filed July 19, 1961                              9 Sheets-Sheet 1
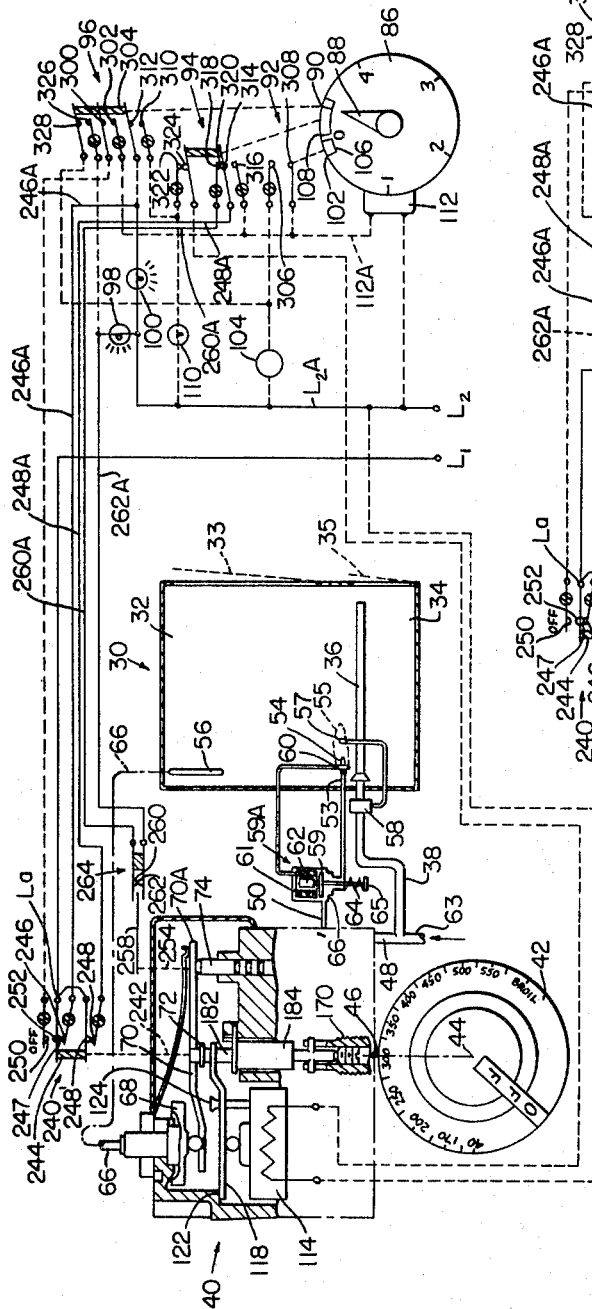
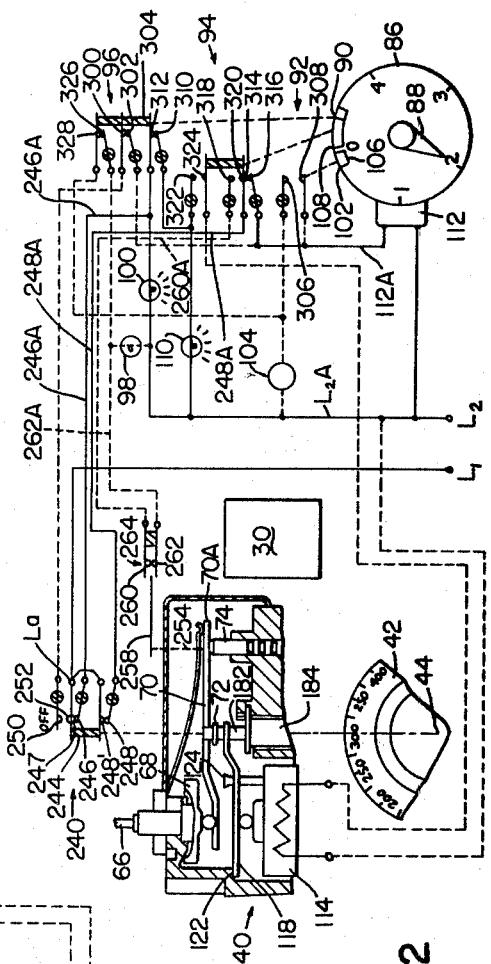
INVENTOR.
JAMES R. WILLSON
BY
*Cauda & Cauda*
HIS ATTORNEYS

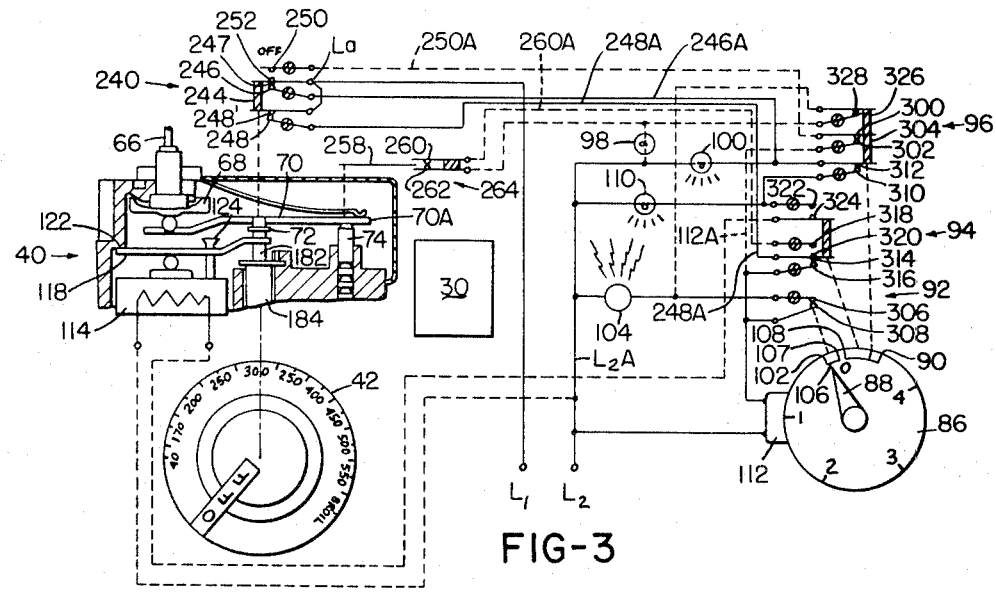

June 4, 1968   J. R. WILLSON   3,386,655
CONTROL SYSTEM FOR AN OVEN OR THE LIKE
Original Filed July 19, 1961   9 Sheets-Sheet 3

INVENTOR.
JAMES R. WILLSON
BY
Candor & Candor
HIS ATTORNEYS

June 4, 1968   J. R. WILLSON   3,386,655
CONTROL SYSTEM FOR AN OVEN OR THE LIKE
Original Filed July 19, 1961   9 Sheets-Sheet 4

INVENTOR.
JAMES R. WILLSON
BY Caudor & Caudor
HIS ATTORNEYS

June 4, 1968 J. R. WILLSON 3,386,655
CONTROL SYSTEM FOR AN OVEN OR THE LIKE
Original Filed July 19, 1961 9 Sheets-Sheet 5

INVENTOR.
JAMES R. WILLSON
BY
*Cauda & Cauda*
HIS ATTORNEYS

June 4, 1968  J. R. WILLSON  3,386,655
CONTROL SYSTEM FOR AN OVEN OR THE LIKE
Original Filed July 19, 1961  9 Sheets-Sheet 9

*INVENTOR.*
JAMES R. WILLSON
BY
*Cauda & Cauda*
HIS ATTORNEYS

United States Patent Office 3,386,655
Patented June 4, 1968

3,386,655
CONTROL SYSTEM FOR AN OVEN
OR THE LIKE
James R. Willson, Greensburg, Pa., assignor to Robertshaw Controls Company, a corporation of Delaware
Application Nov. 23, 1964, Ser. No. 416,184, which is a continuation of application Ser. No. 125,138, July 19, 1961. Divided and this application Dec. 5, 1966, Ser. No. 619,086
9 Claims. (Cl. 236—15)

ABSTRACT OF THE DISCLOSURE

This disclosure relates to a control means that can be manually set to tend to maintain the temperature effect of a heating means at a selected temperature effect until a heat motor of the control device is activated whereby the activated heat motor will automatically adjust the control device to tend to maintain a second temperature effect of the heating means until the manual manipulator means of the control device is moved to its off position, the manual manipulator means of the control device being adapted to set the control device in its off position to stop the operation of the heating means before and after the heat motor has adjusted to the control device to the different temperature setting thereof.

This application is a divisional patent application under Rule 147 of its co-pending parent patent application, Ser. No. 416,184, filed Nov. 23, 1964, now abandoned which, in turn, is a continuation of its co-pending patent application, Ser. No. 125,138, filed July 19, 1961, now abandoned.

This invention relates to the temperature control of heated spaces, such as cooking ovens, and the like.

One of the features of this invention includes a relatively simple and efficient thermostatic unit having a thermostat on-and-off manipulator which unit is used in connection with a relatively simple timer having a timer knob which is manually movable from an "off" position to a plurality of "on" positions, such as a combined thermostat and timer controlled heating zone, and the like. After the timer knob has been moved to any of such on positions, the knob and the timer mechanism controlled thereby are returned by a motor and the like to the off position. While so returning, the knob and mechanism governed thereby may cause the thermostat unit to control a heater in the space being heated to produce a normal heating temperature, such as a normal cooking temperature in the oven for the period time selected by the setting of the timer knob. When the knob and mechanism controlled thereby return toward the timer off position, they may enter a thermostat unit modifying position where the timer modifies the setting, condition, or the operation of the thermostat unit to cause the thermostat unit, for example, to produce a temperature lower than the temperature produced in the normal previous period of time. The timer pauses in this position and holds this operation in modified condition until the user desires to terminate the entire heating procedure. To do so, the user may then turn the thermostat manipulator to the off position, whereupon the timer automatically moves to its own timer off position and automatically de-energizes itself, so that both the heating operation and the timer operation are stopped, and the system is placed in condition for adjustment for any desired future cooking operation.

The foregoing operation is particularly useful when it is desired to cook food in the oven for a predetermined or selected normal thermostatically controlled period of time, which may be obtained by turning the thermostat manipulator to a desired temperature on position and by turning the time to a selected timed period of time position, such as a period of two hours or the like. The food is then cooked in the oven at the desired thermostatically controlled temperature until the expiration of such selected period of time, whereupon the operation of the system may be modified, as by modifying the operating temperature of the system automatically to a reduced warming, or heat holding temperature which holds the food at the desired lower temperature indefinitely while the remainder of the meal is being prepared or consumed. When the time arrives when the food in the oven is to be removed from the oven, the user then turns the thermostat manipulator to the off position at about the time when the food is being removed or has been removed. When the manipulator is turned to the off position, the heater is de-energized and the timer knob is automatically caused to move to its own timer off position and the timer to become de-energized at such timer knob off position, completely to de-energize the entire system and to place it in readiness for some desired future use.

This type of cooking operation is also advantageous where a meal has been timed and prepared for an expected time of service; but some unexpected delay, such as late arrival of guests and the like, delays the serving of the meal. The modified or lower temperature setting of the thermostat unit, automatically reduces the temperature maintained in the oven to maintain the contents of the oven at the best possible temperature to hold the food in readiness whenever it is finally possible to serve the meal at such delayed time.

Instead of modifying the temperature to be maintained by the thermostat unit during the modified period of time, a different type of modification may be provided for the thermostat unit. For example, the thermostat manipulator may be automatically returned to the off position by such modifying action and this in turn may cause the timer knob to proceed to the off position and to turn the timer off, so that the entire cooking operation is terminated and the thermostat unit and the timer are placed in off positions in readiness to be used again under any desired conditions.

Another feature of this invention is to provide a modifying temperature action for a thermostat unit, such as a lower temperature setting or operation. Such modifying action may be performed by a heat motor, an electromagnetic action, or the like which may be caused to operate when the timer knob reaches the modifying position. When the heat motor, for example, is heated, such heat motor automatically changes the thermostatic setting of the thermostat unit to produce a different temperature control. For example, such heat motor may cause the thermostat unit to produce a lower temperature in the oven or other space than the previous or normal temperature which the thermostat unit had been producing in accordance with the thermostat manipulator setting.

Another feature of this invention is the provision of the thermostat unit which may be operated or produced without the temperature modifying unit, such as the heat motor, so the thermostat unit may be sold or produced for use without such modifying unit, when desired.

Another feature of this invention is to provide improved automatic controls or manual controls for a gas heater and the like. According to this invention, the gas heater or heating arrangement may include a main gas burner and a pilot burner. The main gas burner may be fed with main gas burner gas through a main gas burner thermostat valve. The pilot burner may be fed with pilot gas at a rate to produce a small pilot flame or pattern and a large pilot flame or pattern, depending upon the control conditions imposed on such pilot burner. The temperature responsive element of the main gas burner thermostat valve is so positioned that it is only responsive to the production of the large pilot flame or pattern and is not effective to open the valve except when such large flame or pattern is produced. It is therefore possible to produce a relatively simple and small pilot gas controller which controls only the pilot gas flow to control the temperature of the compartment to be heated by a main gas burner. This pilot control causes the pilot burner to produce a small flame or pattern when no heating is desired from the main gas burner, and to produce the relative large pilot flame or pattern when heat is desired from such main gas burner. If desired, the pilot gas flow may be controlled by a thermostat unit of this invention. Such a thermostat unit may be relatively small and simple, as it is only required to control pilot gas.

Another feature of this invention is to provide a relatively small and effective thermostat unit which has an operatively fixed pilot gas control means to feed pilot gas to a pilot burner at a rate to produce a relatively low pilot flame or flame pattern. The thermostat unit also has an operationally variable pilot gas control to feed pilot gas to said pilot burner to produce a relatively high pilot flame or flame pattern, preferably in response to temperature conditions produced by the main gas burner of the installation. Such thermostat unit may control thermostatically the operation of the variable pilot gas control to cause the flame of the pilot burner to turn on and off the main gas burner construction as elsewhere described.

Another feature of this invention is to provide a thermostat unit for thermostatically controlling the operation of a heater, which thermostat unit has switch constructions to be connected with switch constructions in a timer to cause the timer to control the operation or to time the operation of the thermostat unit through the medium of such switch constructions. The timer preferably is of the type which is manually set from its off position to a selected timed operation position and then returns automatically to its off position. In addition, if desired, such switch constructions may also cause indicating devices to indicate the condition of the system being controlled, and if desired, to cause the thermostat unit to be modified or stopped, and to cause the timer to be stopped and be returned to its off position.

Another feature of this invention includes a thermostat unit which has a rotatable thermostat manipulator and a shaft with a threaded construction fixedly secured to the manipulator and being rotatable thereby to move such shaft axially while being rotated. This shaft is connected by a rotationally fixed, axially slidable joint to a fulcrum pin which has a thermostat arm fulcrum axially movable by axial movement of said shaft to desired temperature positions in one axial direction. Said fulcrum also is freely movable beyond such desired positions in that direction by the free movement caused by said slidable joint. A thermostat arm is fulcrumed on such a fulcrum and is operated by a thermostat element which rocks the arm about such fulcrum. An energy controller, such as a valve and the like, is operated by the thermostat arm in response to temperature conditions of the thermostat element. A modifying construction moves the fulcrum beyond the desired temperature positions set by the manipulator to modify the temperature controlling operation of the unit. Such modifying construction may be electrically operated, such as by an electrically energized heat motor.

Accordingly, it is among the many objects of this invention to provide constructions and methods embodying one or more of the features herein set forth.

Other objects are apparent from this description and/or the accompanying drawings in which:

FIGURE 1 is a schematic and diagrammatic view of the invention as applied, for example, to a gas range, and indicating the oven as having been preheated to a selected heat temperature, such as 300°, with the oven ready to receive articles to be cooked, and with the timer ready to be set to a desired timed automatic temperature, or alternately, for the oven to be operated under thermostatic control without timer control, as desired.

FIGURE 2 is a view similar to certain portions of FIGURE 1, and showing the timer as having been set to position 2 ready to time the baking operation for two hours or the like.

FIGURE 3 is a view similar to FIGURE 2, and showing the timer as having reached a position just prior to zero.

FIGURE 4 is a view similar to FIGURE 3, and showing the baking operation as having reached the zero position of the timer.

FIGURE 6 is a view similar to FIGURE 5, but showing the thermostat in the off position, so the timer may be operated as a timer only suitable for timing any operation such as a surface unit cooking operation and the like.

Figure 5:
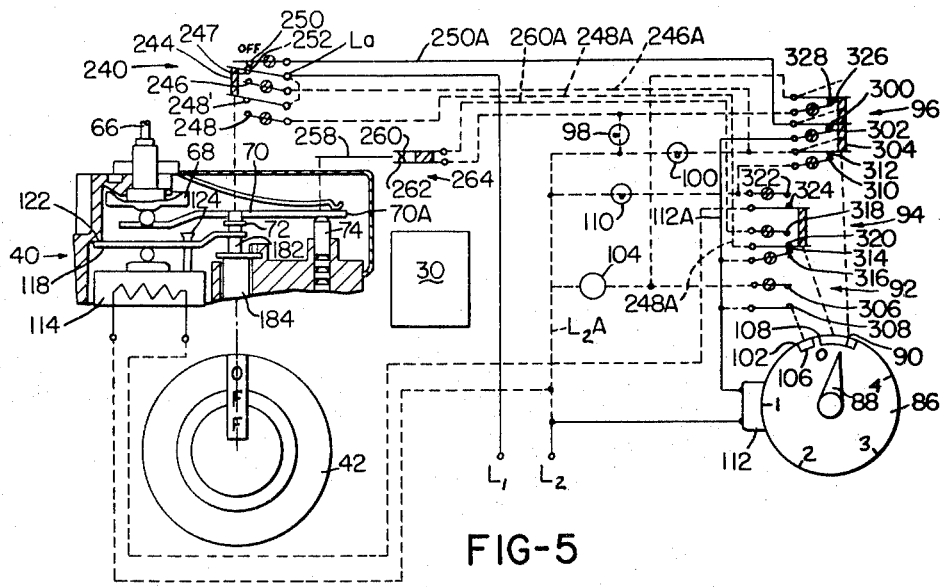
FIGURE 5 is a view similar to FIGURE 4, and showing the thermostat as having been set at the off position, and the timer being driven to the timer off position, but not quite having reached it.

In FIGURES 1–6, etc., the wiring diagrams show the electric wires or connectors in heavy lines only where electric current is flowing and the remaining wires or connectors, in which the electric current is static or not flowing, are shown in dotted lines. There is no electrical connection where the illustrated lines cross each other except where a relatively heavy dot has been added to indicate an electrical connection. The various switches have been diagrammatically illustrated as of the slow make and break type, but it is to be understood that other types of switches may be used, which may be of the fast or snap make and break type, as desired. The diagrammatic showings of the switches are intended to indicate that any suitable type of switch may be used. Some of the relatively stationary contact blades are shown as held by an insulating block or the like, to make the stationary nature of such blades more readily apparent.

For convenience in description, certain words of directional description are used, such as upward, downward, vertical, horizontal, etc. These words are used in connection with the direction shown in the drawings. However, the members in actual use may have different directions from those illustrated and described.

One embodiment of this invention is illustrated in FIGURE 1, which shows diagrammatically how this invention may be applied, for example, to an oven 30, which may be the oven of a kitchen range which may use gas as the heating medium. The oven 30 may have a baking compartment 32 and a broiling compartment 34. A gas burner 36 is placed between the bake and broil compartments and is fed gas through the pipe 38 under the control of the thermostat control unit 40 and in response to the temperature of compartment 32 and the position of the manipulator or handle 42, which may be turned about the axis 44 to any desired temperature or on position with respect to the stationary pointer 46.

The gas may be fed to the main burner 36 under the control of the thermostat unit 40 by any well-known means or arrangements now known for this type of control, in a manner to maintain a selected temperature in the oven compartment 32 in response to the setting of the manipulator 42 to a selected position.

However, according to a preferred embodiment of this invention, the heating action of the main burner or heater 36 may be controlled by controlling the flow of pilot gas only through the thermostat unit 40. The pilot gas is caused to produce a small pilot flame when no heating by burner 36 is required, and to produce a large pilot flame when heating by burner 36 is required. The main burner 36 is automatically lighted when the pilot flame is large and is extinguished when the pilot flame is small.

To this end, pilot gas may be fed into the body of the thermostat unit 40 through the pipe 48. A portion of this gas may then flow through suitable passageways in the unit 40 so that a portion is fed to the pilot supply pipe 50 under a manually set throttling action to provide an operationally fixed pilot gas control. Another portion of the pilot gas is fed through suitable thermostatically controlled passageways in response to thermostatic control in the unit 40 according to the setting of the manipulator 42. This last portion of pilot gas is also fed to the pilot supply pipe 50. The pipe 50 feeds to the pilot 53, the end of which may be ignited to form either a small pilot flame or flame pattern 54 or a large pilot flame or flame pattern 55. The flames 54 and 55 may be fed with pilot gas through a single orifice, if desired. The small pilot flame 54 is intended to be continuously ignited under a "standby" condition, at which time gas is fed only through the passageways in the unit 40 which have manually set constant conditions, more fully elsewhere described. These constant conditions may be periodically adjusted, however, to obtain a small pilot flame 54 of desired size. When the temperature in the compartment 32 is below the temperature selected by the setting of the manipulator 42, the thermostat bulb 56 causes gas to be fed to the pipe 50 and pilot burner 53 at a slightly higher pressure than is produced by the manually set constant conditions, and produces the larger pilot flame 55.

The production of the larger flame 55 in turn heats a thermostat bulb 57, which may be a mercury bulb, if desired, which opens the main burner valve 58 to feed main burner gas from the pipe 38 into the main burner 36. The main burner 36 is ignited by the pilot flame 55. On the other hand, when the temperature in compartment 32 rises in response to the heat produced by the main burner 36, then the thermostat bulb 56 and the unit 40 cut off the thermostatically controlled, higher volume pilot gas flow to the pipe 50, so that the rate of flow in the pipe 50 and pilot 53 produces only the small pilot flame 54. This permits the thermostat bulb 57 to cool sufficiently to close the valve 58 and thus to turn off the main burner 36. This turning on and off of the main burner 36 in response to the temperature of the bulb 56 continues as long as is desired by the user.

The thermostat bulb 57 is suitably insulated from the effects of the heat produced by main burner 36 so the heat from the burner 36 is insufficient to maintain the valve 58 open in the absence of the heat from large pilot flame 55. The bulb 57 requires high heat from flame 57. Consequently, the feed of gas to burner 36 is stopped whenever the large pilot flame 55 is not produced.

The user may choose to operate the system either under the control of thermostat unit 40 only, or under the combined timer and thermostat unit control which is elsewhere described. The timer may be used independently of the thermostat unit 40 to indicate a time cycle for some other operation on the stove or elsewhere.

Suitable safety features are provided to prevent the feeding of unburned gas into the oven if the pilot flame 54 should be extinguished or accidentally should not be ignited. For this purpose, a safety valve construction 59A may be provided which turns off the discharge of gas into the entire oven system illustrated whenever the pilot flame 54 (or flame 55) is not burning. The valve construction 59A is made so that it closes and cuts off the feed of pilot gas to pilot 53 whenever the thermocouple 60 is not heated by the flame 54. To this end, an electromagnet 61 is energized by thermocouple electric current whenever the thermocouple 60 is properly heated by the flame 54 and maintains the magnetic armature 62 in the upward position, as shown in FIGURE 1, and with the valve 59 in an upward position to permit gas to flow from the pilot pipe 50 to the pilot burner 53. However, should the thermocouple 60 become relatively cold by not being heated by the flame 54, then the magnet 61 becomes sufficiently electrically de-energized because of the reduction of thermocouple electric current and releases the armature 62 for downward movement. The compression spring 64 pushes the knob 65 downward and simultaneously pushes the valve 59 against the valve seat 66 completely to turn off the gas from the pilot burner 53. The pilot burner then cannot produce either the small pilot flame 54 or the large pilot flame 55. The main burner thermostat 57 consequently cannot be heated and cannot open the main burner valve 58. Therefore, unburned gas can not be discharged into the oven either by the pilot 53 or the main burner 36.

When it is desired again to start the system or to reignite the flame 54, the push button 65 is pushed upward, so that the armature 62 is placed adjacent the magnet 61. This permits the flow of gas to the pilot 53, which may then be ignited. The knob 65 is held pushed in for about 30 seconds to permit the thermocouple 60 to become sufficiently heated to energize the electromagnet 61 to hold the armature 62 in the upward position. The system may then operate under normal conditions.

The pilot flame 54 is intended to be continuously operating under "standby" conditions and is expected to remain ignited unless some defect has occurred in the system. Such defect should be rectified before attempting to reignite the pilot 53. The ignition procedure by pushing of the knob 65 upward for thirty seconds or more is only performed initially to ignite the flame 54, after which the system may be in readiness continuosly for the cooking operations which are elsewhere described.

The thermostat unit 40 causes main burner gas to be fed to the main burner 36 in response to temperatures in the oven compartment 32 to maintain the compartment 32 at the temperature selected by the positioning of the manipulator 42. Alternatively, when the manipulator is turned to the "broil" position, the gas is fed through the pipe 38 substantially continuously because of the very high temperature setting of the manipulator 42 so an efficient broiling operation is performed when food is placed in the broiling compartment 34 under the burner 36.

The compartments 32 and 34 may be provided with independent doors 33 and 35, of well known construction.

The thermostat unit 40 is responsive to the temperatures in the compartment 32 through the medium of the thermostat bulb 56 which is placed in the oven, 30 and which contains a suitable thermostat fluid, either gaseous or liquid. The pressure is transmitted through the tube 66 to the expansible and contractable diaphragm or bellows 68 to rock the thermostat arm 70 about the fulcrum point or platform 72. The arm 70 pushes against the valve plunger 74 and raises or lowers such plunger 74 to open or close the valve 76, FIGURE 7, against the action of spring 78, thus to cover or uncover the valve seat 80 and to permit or stop the flow of pilot gas from the passageway 82 and pipe 48 to the passageway 84, which in turn discharges such gas into the pipe 50, while another stream of pilot gas is passing through other passageways to be described, which also discharge into the pipe 50.

A timer 86, FIGURE 1, has a handle or knob 88 which may be allowed to remain at the off position 90, as shown in FIGURE 1, so the oven 30 and the thermostat unit 40 may be operated independently of the timer 86. A baking operation may then be performed and timed independently of the timer by the operator. Alternatively, the operator may select to use the timer to aid in governing a preheating operation of the oven, as will now be described.

Some of the other possible operations are shown in FIGURES 2–6.

If the user desires to bake or broil food in the oven 30 under the control of the thermostat unit 40, but not under the control or time indication of the timer 86, the timer knob or handle 88 is placed in the off position 90, as illustrated in FIGURE 1, as more fully explained in the following description.

*Manual operation, with thermostat only, FIGURE 1*

The timer handle 88 is connected by a shaft or the like to the switches 92, 94, and 96. The switch 96 is closed up or down at all handle 88 positions except at position 90 at which time switch 96 is in open position, or up position, of FIGURE 1. Switch 94 is in up position, FIGURE 1, while timer handle is in the zone between 108 and 90 to close contacts 322, 324, 318, 320. Switch 92 is in up position while handle 88 is in zone 106, but switch 92 is in down position at all other times, as shown in FIGURE 1.

The user may place the manipulator 42 of the thermostat unit 40 at any desired position, such as a "bake" position, from 170° to 550°, for example, or at the "boil" position, which is a very high temperature setting well above any temperature normally attainable under boiling conditions. The user may then proceed to bake or broil, as is usual with ranges provided with a thermostat unit of prior constructions. In the off position 90 of the timer 86, the timer 86 does not interfere, or modify the operation of the thermostat unit 40 in any manner whatsoever, except that, if desired, it positions the switch 94 of the timer 86 in the up position so when the manipulator 42 is turned to an on position, such as 300°, the light 98 can be intermittently illuminated and the "oven on" light 100 is illuminated. The light 100 is illuminated continuously by closed contacts 246, 247 of switch 240 and the light 98 is illuminated intermittently when the oven temperature in compartment 32 passes up and down past the selected temperature, such as 300° as illustrated in FIGURE 1, intermittently to close contacts 260, 262 of switch 264. Such light 98 is not illuminated when the compartment 32 temperature and hub 64 are either substantially below the selected temperature or substantially above the selected temperature, and is illuminated when the oven compartment is substantially at the selected temperature as is elsewhere more fully described in connection with FIGURES 22, 23 and 24. The light 100 indicates that the oven is being heated, and light 110 indicates that the oven heating is under automatic control of unit 40 and timer 86, as elsewhere described.

Hence, it is to be seen that the user may operate the oven 30 under the control of the thermostat unit 40 without any timing guidance or control from the timer 86 when the timer handle is at 90, as shown in FIGURE 1.

*Automatic operation under joint control and indication of timer and thermostat unit, FIGURES 1–5*

The user may perform an oven cooking operation under the control of the thermostat unit 40 and under proper indications and control from the timer 86.

The user may perform a preheating operation of the oven, without any food in it, until the oven temperature reaches the selected temperature, as selected by the position of the manipulator 42. This preheating operation may be performed under switch conditions of FIGURE 1, until the oven reaches 300° or other selected temperature, which causes light 98 to be illuminated. Thereafter, the user may insert the food into the compartment 32 and set the timer handle 88 for any desired period of normal thermostatically controlled operation subsequent to the insertion of the food. This type of operation is preferred by many users. This may be accomplished by first setting the timer knob 88 and the thermostat unit knob 42 in the positions shown in FIGURE 1, to produce a preheating action prior to the insertion of food in the oven 30.

With the controls set as indicated in FIGURE 1, the oven is permitted to come to preheat to the selected temperature, such as 300°, which is chosen merely by way of example. During this preheating operation, the oven light 100 is continuously illuminated by closed contacts 246 and 247 but the light 98 remains dark until the oven has reached the 300° or other selected temperature, at which time the light 98 illuminates for a short period of time until the arm 70, at its outer end 70A, "overshoots" upward above the valve plunger 74, which causes the light 98 to be turned off by the opening of switch 264 and it will remain dark until the oven has cooled substantially to the selected temperature when the light 98 again illuminates temporarily and continues to flick on and off by the opening and closing of switch 264 as the temperatures rise and fall slightly above and below the selected temperature, such as 300° in response to the thermostatic control by unit 40. This indicates to the user that the oven is now properly preheated and that the oven is ready to receive the food.

Thereupon the user inserts the food in the compartment, such as compartment 32, and then sets the timer 86 to the desired normal cooking interval of time, such as at two hours, as shown in FIGURE 2. The food then will be cooked in the oven while the knob or handle 88 proceeds to return clockwise until it reaches the position 102 and zone 106, FIGURE 3, which closes contacts 306, 308 and which causes the buzzer 104 to sound for 15 seconds, while the knob or handle 88 is passing the zone 106. This continues substantially until a time just before the knob 88 reaches the zero position 108 at the end of zone 106, at which time the buzzer ceases to operate because contacts 306 and 308 are opened at the end of zone 106.

During the time that the handle 88 is moving from position 2 to position 102, the buzzer 104 is not sounded, as shown in FIGURE 2, but the lights 100 and 110 are illuminated by the closed switches 246, 247 and 310, 312 to indicate that the oven is operating under thermostatic and timer control and that automatic operation is being provided, as indicated in FIGURES 2 and 3.

When the knob 88 reaches the position 108 as shown in FIGURE 4, the motor 112 of the timer stops, because of open contacts 314, 316 and 250 and 252, thus causing the timer to stop. The light 98 illuminates intermittently to indicate that the elapsed time or higher temperature cooking has been completed. Just before this time the buzzer 104 also had been operating for 15 seconds while handle 88 was passing zone 106, in FIGURE 3.

*Modification, such as a change to a lower temperature for final period of cooking*

When the higher temperature or normal cooking operation reaches the stage with timer knob at 108, as illustrated in FIGURE 4, the timer 86 causes the thermostat unit 40 to be modified, such as by being adjusted automatically to operate at a lower controlled temperature, which cooking operation will continue indefinitely until the user turns the thermostat unit manipulator 42 to the off position of FIGURE 5.

However, while the controls are still in the positions indicated in FIGURE 4, the heat motor 114 is heated by the energization of the heater 116, by the closed contacts 246, 247 and 310, 312 and 322, 324, in a manner automatically to set the unit 40 at a lower temperature than that indicatetd by the knob 42. This may be a warmth retaining temperature, if desired.

The heating of the heat motor 114 causes the lever 118 to be raised by the ball or pusher 120 of the heat motor, so the lever 118 swings about the fulcrum point 122 and raises the fulcrum point or platform 72 of the unit 40 to a higher position or until the lever 118 is stopped by the stop member 124. In this manner the fulcrum point 72 is set at the equivalent of a much lower temperature than the setting by manipulator 42 and this causes the thermostat valve 76, FIGURE 7, which is operated by the plunger 74, to operate at this lower temperature range.

At this lower temperature operation, the light 98 and the buzzer 104, FIGURE 4, are intermittently energized by intermittently opened and closed contacts 260, 262, as elsewhere described, to warn the user that the dinner is about to be ready for serving. For example, the user may permit this lower temperature cooking or warming operation to continue for twenty to thirty minutes. When the user is ready to serve the dinner, the user turns the thermostat manipulator 42 to the off position, as indicated in FIGURE 5. This causes the timer motor 112 to be energized and to drive the timer handle 88 to the final off position 90, as in FIGURE 1, and to cause the thermostat valve 76 to be completely closed, FIGURE 7. The valve will then remain closed until such time as the thermostat manipulator 42 is again turned to some selected temperature position for some future cooking operation, which may repeat the one so far described, or which may be a different cooking operation. The timer will be in knob position 90 or off position, or "cleared" condition and the thermostat manipulator 42 will be in the off position, both ready for some future use, as desired.

The user is continuously warned by the intermittent operations of the light 98 and buzzer 104 as long as the manipulator 42 and knob 88 remain in the positions of FIGURE 4. Hence the user is not likely to fail eventually to turn the manipulator 42 to off position to terminate the entire timed operation.

Figure 6:
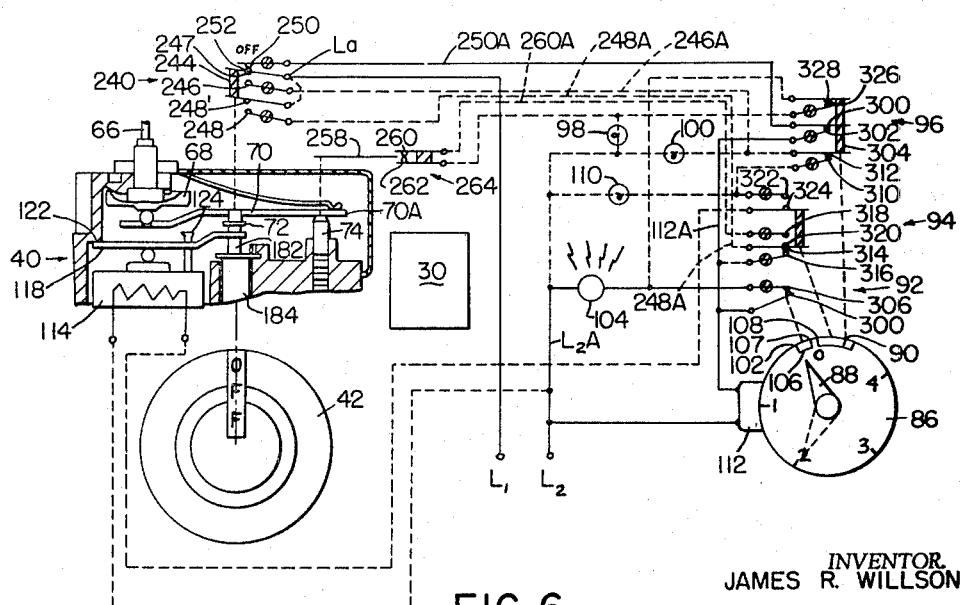

*Use of timer only without oven cooking, FIGURE 6*

If the user should desire to operate the timer 86 to indicate timed operations other than the operations performed in the oven 30, the positions shown in FIGURE 6 may be used. For this purpose, the thermostat manipulator 42 is placed or remains in the off position and the timer knob 88 may be moved to some timed position for the desired interval of time, such as position 2. When this is done, the timer motor 112 drives the timer, so the handle 88 gradually moves toward position 102, whereupon contacts 306, 308 are closed and the buzzer 104 is energized through closed switches 250, 252 and 300, 302 and 306, 308 and begins to sound and will continue to sound for 15 seconds while the handle 88 passes through zone 106 just before zero position 108. The buzzing sound terminates as the zone 106 is passed. The timer motor 112 continues to run, however, until the handle 88 reaches the off position 90, whereupon the timer motor stops and all operations are de-energized. In this manner the timer 88 has been used to indicate any desired time interval in connection with any desired operation, the end of which is indicated and warned by the sounding of the buzzer 104 for 15 seconds as the handle 88 passes the zone 106.

*The thermostat unit 40*

The thermostat unit 40 is particularly advantageous in connection with the control of pilot gas exclusively for the pilot structure in a manner that the high volume gas to be used for the main burner 36 does not pass through the working parts of the unit 40, but rather flows through the pipe 38 outside the unit 40, or through a separate passage separate from the pilot controlling parts of the unit 40.

The pilot gas enters through the pipe 48, FIGURE 1, and passes through the unit and leaves through the pipe 50 and enters the pilot 53 to produce the small pilot flame 60, or the large pilot flame 55. Both of these flames are of use in connection with the ignition of the burner 36, but the volume of gas used by the pipe 50 is relatively small compared with the volume of gas which flows through the pipe 38 for the main burner 36. For this reason, the working parts or pilot controlling parts of the unit 40 may be made of relatively small size, since unit 40 may be made to handle only a small volume of pilot gas and yet efficiently to control the cycling of the main burner 36 without actually having such gas pass through the working parts of the unit 40.

Figure 17:
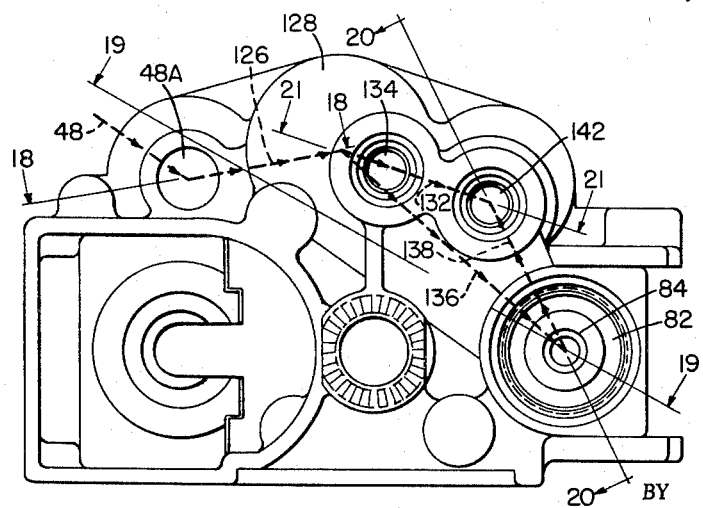
FIGURE 17 is a view somewhat similar to FIGURE 8, but showing the end view of the thermostat with the heating unit removed, and indicating certain gas flow paths.
Figure 18:
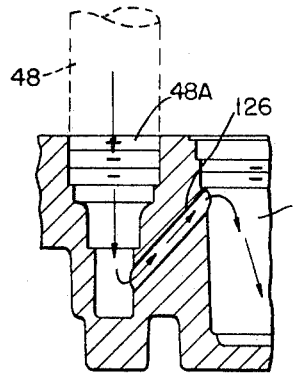
FIGURE 18 is a partial cross section substantially along the line 18—18 of FIGURE 17.
Figure 19:
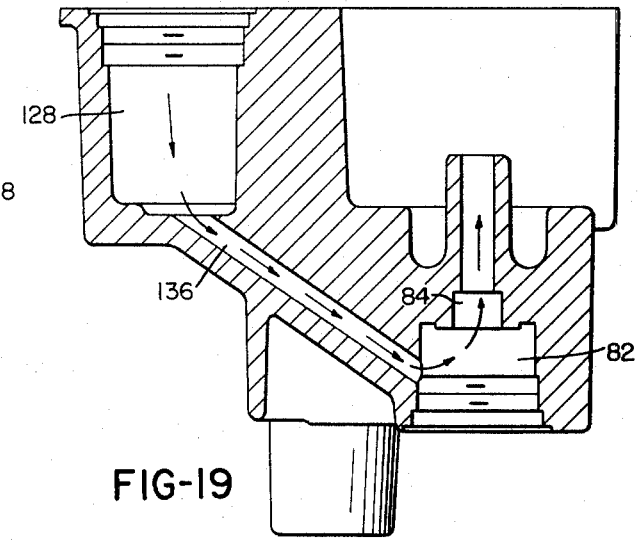
FIGURE 19 is a cross section substantially along the line 19—19 of FIGURE 17.
Figure 20:
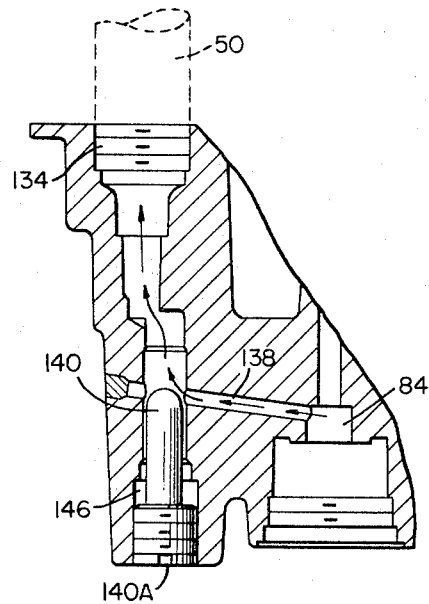
FIGURE 20 is a cross section substantially along the line 20—20 of FIGURE 17.
Figure 21:
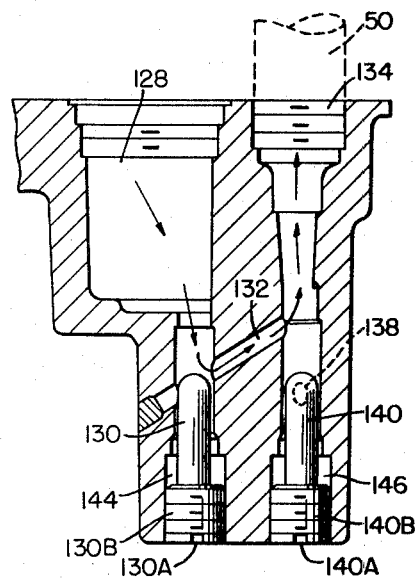
FIGURE 21 is a cross section substantially along the line 21—21 of FIGURE 17.

Referring first to FIGURES 1, 7 and 17 through 21, the pilot gas from pipe 48 enters through the inlet 48A of FIGURE 18 and passes through the passageway 126 to the top of filter 128 and then passes downwardly through the filter 128 and past the adjusting key or pin 130 and through the passage 132, FIGURE 21, to the discharge outlet 134, which discharges pilot gas into the pipe 50 of FIGURE 1.

The filter 128 may include the usual filter cavity and filter unit of well known construction.

Another branch from the bottom of filter 128 passes through the passage 136, FIGURE 19, and into the valve chamber 82, below the valve 76 of FIGURE 7. When the valve 80 opens this pilot gas enters the chamber 84 on the discharge side of the valve 80 and from thence flows through the passage 138, past the adjusting key 140, FIGURES 20 and 21, from which it passes to the outlet 134, which discharges into the pipe 50 of FIGURE 1. The adjusting keys 130 and 140 may be turned through the adjusting openings 144 and 146 respectively by means of the screw driver slots 130A and 140A respectively in the threaded heads 130B and 140B of pins 130 and 140. The flow of pilot gas from the inlet 48A is indicated by dotted lines in FIGURE 17, which are marked with reference numerals corresponding to the gas passages in FIGURES 18–21.

By this construction pilot gas to produce a small flame as pilot 53 passes through inlet 48A, FIGURE 18, passageway 126, filter 128, past adjusting pin 130, through passage 132, FIGURE 21, discharge outlet 134, pipe 50 and pilot 53. The pin 130 is adjusted by slot 130A to produce a gas flow to produce the small pilot flame 54. At this time, no pilot gas passes valve 76, FIGURE 7, since this valve 76 is closed because knob 42 either is in the off position or else the oven temperature in compartment 32 is in "overshoot" condition above the temperature selected by the setting of manipulator or dial 42 at some on position, such as 300°. Hence the valve 76 is thermostatically closed.

When the oven compartment 32 is at a temperature below the selected temperature or dial 42, the valve 76 is thermostatically opened and causes higher volume pilot gas to flow through passage 136, FIGURE 19, valve chamber 82 past valve 76, FIGURE 7, chamber 84, passage 138, FIGURES 17, 20 and 21, adjusting pin 140, to outlet 134, pipe 50 and pilot 53. The volume and pressure in pipe 50 and pilot 53 are increased by this higher volume pilot gas which passes valve 76 sufficiently to produce the larger pilot flame 55. The pilot gas from outlet 134 and pipe 50 preferably passes through the same pilot orifice, whether the small flame 54 or the large flame 55 is being produced. The larger pilot flame 55 heats the thermostat bulb 57 and opens the gas valve 58 to introduce burner gas from pipe or passageway 38 into the main burner 36. The burner 36 is then ignited by pilot flame 55.

Figure 7:
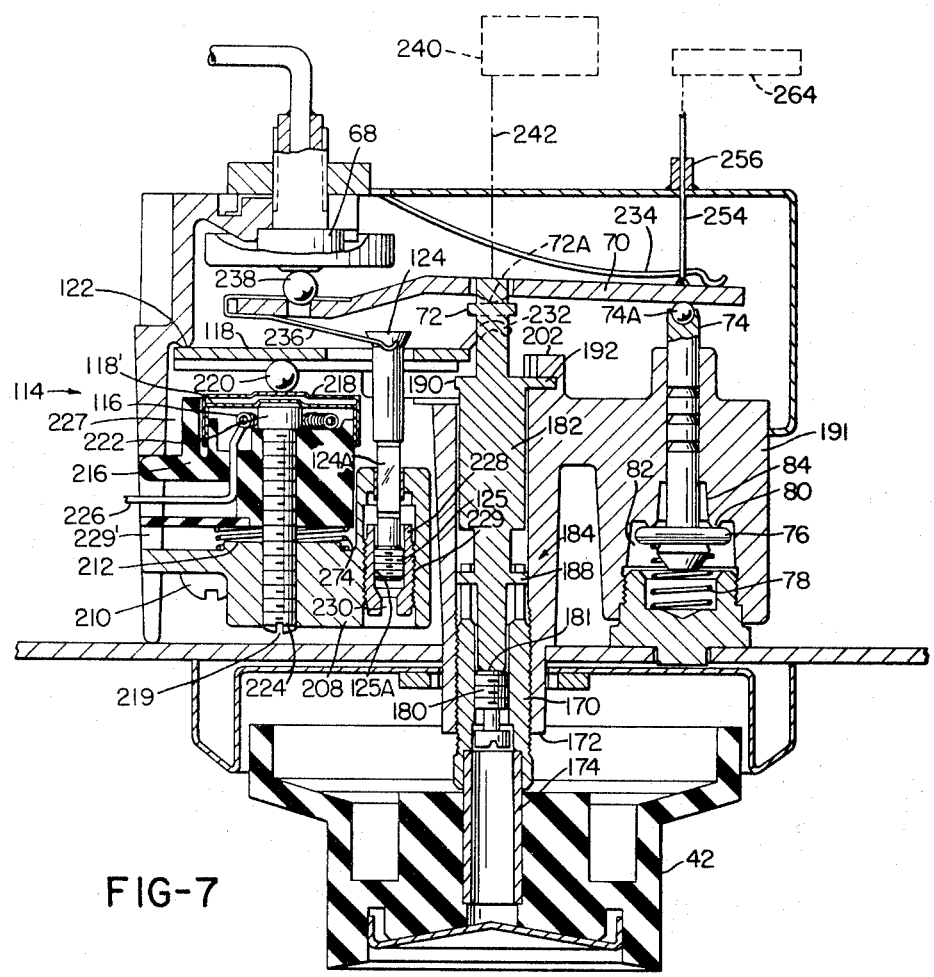
FIGURE 7 is a longitudinal cross section of the thermostat control unit, with the parts shown near the off position of the dial.

When the compartment 32 starts to overshoot in temperature the valve 76, FIGURE 7, closes and reduces the flow of pilot gas in pipe 50 and pilot 53 so the pilot flame is reduced to size 54. This allows bulb 57 to cool and close valve 58 to shut off the main burner gas in pipe 38 from burner 36.

In this manner the thermostat unit 40 indirectly controls the feed of main burner gas to the main burner (or burners) 36 without such burner gas passing through the working or pilot supply parts of the thermostat unit 40.

The pipe or passageway 38 may bypass unit 40 or it may pass through an enlargement in unit 40 for non-pilot working parts of the unit, as desired.

The thermostat unit 40 may therefore be made relatively small but very efficient, as it may be produced to handle only a relatively small amount of pilot gas for pilot flame use only.

*Adjustment of thermostat arm fulcrum 72*

The dial 42 of unit 40 adjusts the fulcrum 72 of the thermostat arm 70 by a combined rotary and axial movement of the dial 42 and a corresponding combined rotary and axial movement of the platform-like fulcrum 72. See FIGURES 1, 7 and 9–16.

FIGURES 1 and 7 diagrammatically show the dial 42, which is fixedly connected to and turns the outside threaded sleeve 170 which is in threaded engagement with the stationary internally threaded cylinder 172 of the cast body of the unit 40. The sleeve 170 is spot welded to the sleeve 174 onto which the dial 42 is slidably keyed in the usual manner with a snap action so the dial 42 is in rotationally fixed relation to the sleeve 170. Rotation of the dial 42 rotates the sleeve 170, which moves axially by reason of its outside threads 176, which are indicated on FIGURE 9. The sleeve 170 is also internally threaded at 178 to receive the calibrating screw 180, FIGURES 7 and 13. Rotation of the screw 180 moves or calibrates the screw 180 axially within the sleeve 170. The screw 180 abuts the end 181 of the fulcrum pin 182.

Ordinarily, the pin 182, which carries the fulcrum 72, is held downwardly against the end of the screw 180, by means of spring 232.

However, there are times when the pin 182 may be lifted upwardly, so that its end 181 is moved upwardly away from the end of the screw 180, and this takes place when the heat motor 114 lifts the arm 118 and the fulcrum 72, as elsewhere described, or when the dial is turned completely to the off position.

Figure 9:
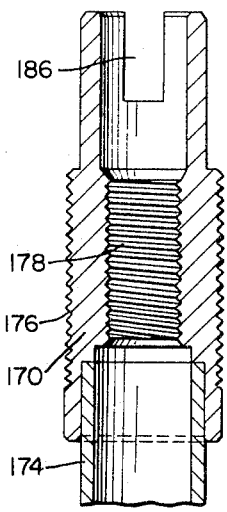
FIGURE 9 is a cross section of the sleeve which produces axial movement upon rotation of the manipulator of the thermostat.
Figure 10:
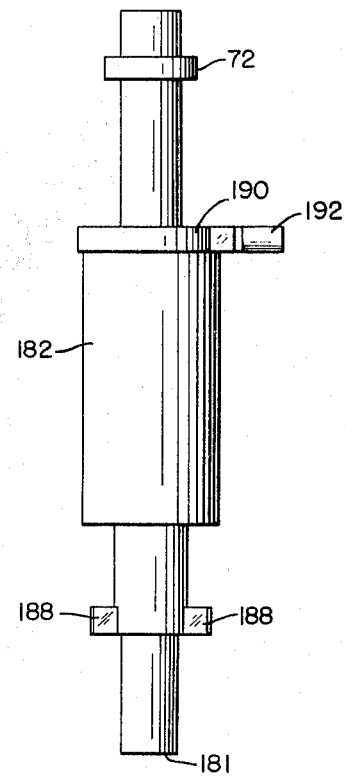
FIGURE 10 is a side view of the thermostat arm fulcrum piece, which is moved longitudinally mainly by the action of the sleeve of FIGURE 9.
Figure 13:
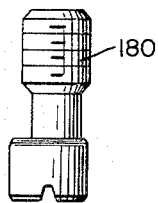
FIGURE 13 is a side view of the calibration screw for calibrating the setting of the manipulator with respect to the action of the thermostat arm.
Figures 11, 12:
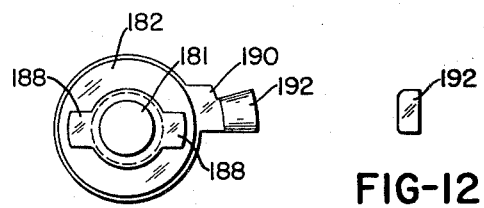
FIGURE 11 is an end view of the lower end of FIGURE 10.
FIGURE 12 is a side view of a portion of FIGURE 11.
Figure 14:
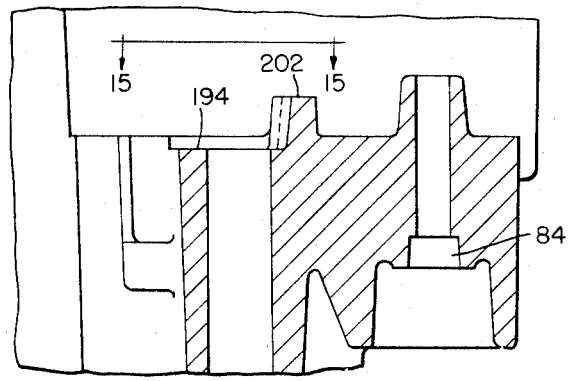
FIGURE 14 is a cross section of a portion of the thermostat cast body on which the rotation limiting pin of FIGURE 10 rides during rotation.
Figure 15:
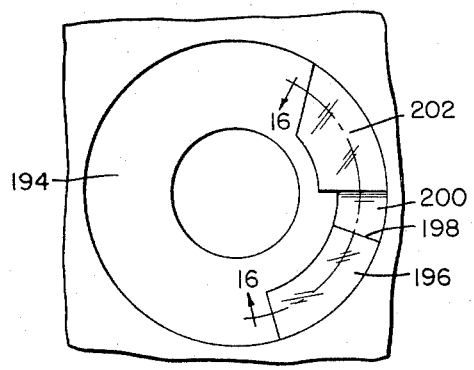
FIGURE 15 is an enlarged end view of FIGURE 14 taken along the line 15—15 of FIGURE 14.
Figure 16:
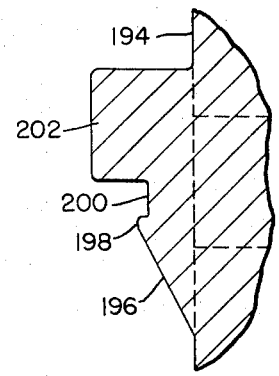
FIGURE 16 is a cross section of the off cam of FIGURE 15 developed along the circular line 16—16 of FIGURE 15.

The sleeve 170 has an axially expandable but rotationally fixed joint 184 with the fulcrum pin 182. As shown in FIGURES 9, 10 and 11, the sleeve 170 has slots 186 which receive key pins 188 of pin 182, so the sleeve 170 and the pin 182 are axially movable away from each other under certain conditions, but they are rotationally locked at the joint 184, which is formed by the slots 186 and the pins 188.

The fulcrum pin 182 has a supporting platform 190 which has an extension or lip 192 which is rounded at the bottom, as shown in FIGURE 12. The platform 190 and the extension 192 move above the supporting surface 194, FIGURES 14, 15 and 16 of the cast body 191 of the unit 40. The extension 192 engages the lifting cam 196, FIGURES 15 and 16, as the dial 42 is being turned toward the off position, so the fulcrum 72 is quickly raised by the cam 196 and finally slides over the hump 198 into the lock groove 200. The hump 198 allows the extension 192 to be moved either in or out of the groove 200, but imparts a "feel" or slight resistance and give which the user "feels" when the knob enters or leaves the locked position. The larger hump 202 prevents the knob 42 from being turned beyond the off position in either direction.

It is thus to be seen that the fulcrum pin 182 may be slidably raised with respect to the sleeve 170, both by the action of the heat motor 114 and by the turning of the knob to the locked off position, which produces a faster upward movement of the pin 182 than is produced by the external threads of the sleeve 170.

*The heat motor 114*

Figure 8:
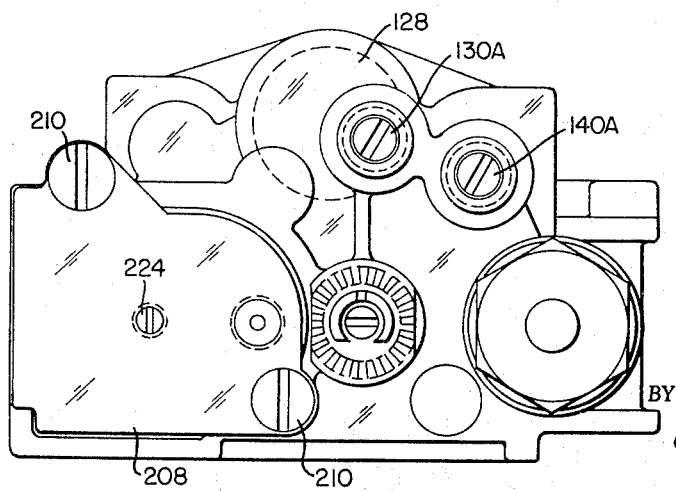
FIGURE 8 is an end view of the unit, with the manipulator, bezel and certain other end parts removed.

The heat motor 114 may be made insertable in and removable from the main casting 191 of the unit 40. If desired, the unit 40 may be used or produced without the heat motor 114. For this purpose, a casting or plate 208, FIGURE 7, forms the bottom of the heat unit 114 and the same may be secured to the main casting 191 of the unit 40 by means of the screws 210, FIGURES 7 and 8. The base 208 has a circular platform 212 which is surrounded by a helical spring 214 and which upwardly pushes an insulating body 216, which carries the heater 116 and the double-walled, expandable diaphragm 218' which may contain a small amount of water or the like which is heated by the heater 18 to expand the same. A ball 220 is welded to the upper membrane of the diaphragm 218'. The lower web of the diaphragm 218' is supported by the head 222 of the screw 224 which is screw threaded on the base 208 for adjustment as to height of the diaphragm 218'. A screw driver may be inserted in the slot 219 for this adjustment. The heater 114 has prongs 226 for connection of the leads of the wires 116A and 324A shown in FIGURE 4.

The upward movement of the lever 118 is limited by the limit pin 124. The lower end of the pin or screw 124 is screw threaded at 125 and receives the sleeve 228 which is internally threaded to receive the external threads 125 of pin 124. The sleeve 228 is externally threaded to engage internal threads at 229 in the cast body 208 of the heat motor. A slot 230 (shown in transverse cross section in FIGURE 7) is provided in sleeve 228 to receive a screw driver so the pin 124 may be adjusted vertically by turning the sleeve 228 with the screw driver in slot 230. The height of the pin 124 may be changed by the rotation of the sleeve 228 to provide the right height for the head of the screw 124.

The external threads 229 in sleeve 228 are of a greater pitch than that of the internal threads at 125A so that the axial movement of sleeve 228 dominates the combined axial movement of sleeve 228 and pin 124.

The pin 124 may be keyed at 124A by making the pin 124 rectangular at that point to prevent rotation of the pin 124.

The lever 118 has a rounded double-prong fork 232 which straddles the fulcrum pin 182 and presses upwardly against the under surface of the fulcrum disc 72 to raise the pin 182 and fulcrum 72 when the heat motor is heated.

The thermostat lever 70 is pressed downwardly by a relatively strong action of the spring 234 at one end and is attached to the spring 236 at the other end. The spring 236 is forked at its right end, FIGURE 7, and bears downwardly against the lever 118 and holds the lever 118 downward under spring action. The ball 238 is welded to the diaphragm 68 and bears against the thermostat lever 70..

The heat motor 114 has the body 216 made of insulating material and the cast metal body 208 which may be made of metal. These bodies are received in the cavity 227 in the main casting 191 of the unit 40. An opening 229' is provided in the main casting 191 of the unit 40 for access to the connectors 226 of the heater 116, etc.

The switches 240 and 264

A multiple pole switch 240 is operated by an extension of the fulcrum pin 182, which is diagrammatically indicated by the line 242. This extension 242 is moved with, attached to, or integral with the top of the fulcrum pin 182. The extension 242 moves the insulating piece 244, FIGURE 1, of the switch 240 so the contacts 246 and 248 are closed whenever the dial 42 has been moved away from the off position to an on position. At that time the contact 250 is open, as in FIGURE 2. However, when the dial 42 is turned to the off position then the contact 250 is closed with respect to a contact 252, as in FIGURE 6.

Another extension 254, FIGURE 7, which is indicated by a line extending from the top of rod 70 immediately above the ball or end 74A of the plunger 74 and may extend through a sleeve or the like 256, FIGURE 7, and has a relatively stiff blade or the like 258 which moves the bendable leaves or blades which carry contacts 260 and 262 of the switch 264.

Figure 22:
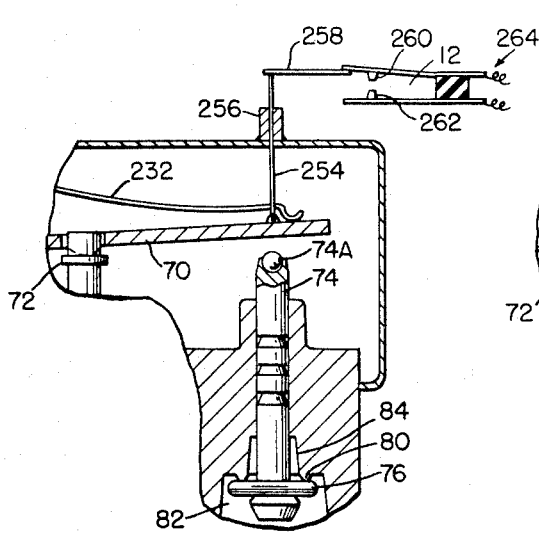
FIGURE 22 is a diagrammatic representation showing a certain switch in the off position of the thermostat manipulator or in the overshoot position of the thermostat arm.
Figure 23:
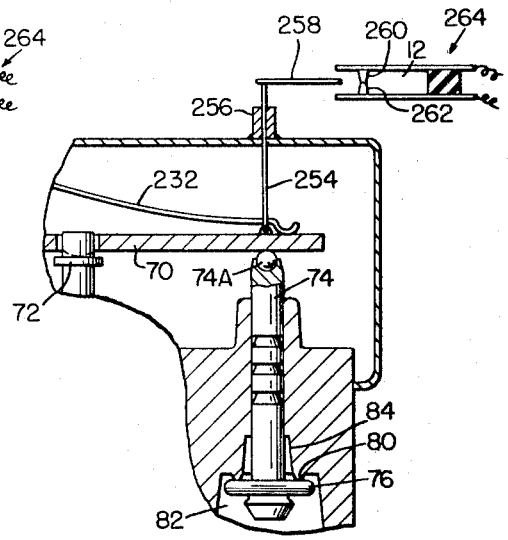
FIGURE 23 is a view similar to FIGURE 22 but showing said certain switch in closed position, as when the thermostat arm is at or near the selected temperature.
Figure 24:
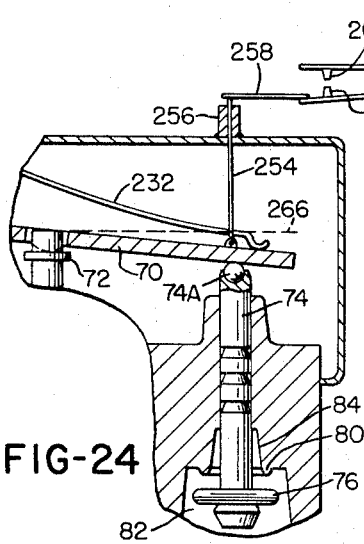
FIGURE 24 is a view similar to FIGURES 22 and 23 but showing said certain switch at a temperature substantially below the selected temperature.

The positions of this switch 264 are shown in FIGURES 22, 23 and 24. The leaf of contact 260 is movable upward, while the leaf of contact 262 remains stationary, as shown in FIGURE 22 when the thermostat lever 70 is in the off position of the dial 42 or when the thermostat arm 70 is in an "overshoot" position, as when the oven has slightly overheated and the bulb 56 has caused the diaphragm 68 to press downwardly beyond the possible upward travel of the plunger 74 when the valve 80 has closed and limited the upward movement of the plunger 74. In the off position of dial 42 the lever 70 is moved upward far beyond the uppermost position of the plunger 74 by the camming action 196, FIGURES 14, 15 and 16, elsewhere described.

FIGURE 23 shows the switch 264 closed at the time that the valve 80 has just closed or just opened. That is, the switch 264 is closed on the adjacent up or down temperature movement of ball 74A near the selected temperature setting when the valve 80 has contacted its seat because the oven has just reached the selected temperature or is just about to leave the valve seat.

FIGURE 24 shows the switch 264 opened by the downward movement of the leaf of contact 262 while the leaf of contact 260 remains stationary when the lever 70 is in an undershoot or cold position below the selected temperature level indicated by the line 266 which would be the level of arm 70 shown in FIGURE 23. The actions of these switches 240 and 264 become apparent from other descriptions concerning the wiring connection with the timer, switches, of the timer 85.

Many features of this invention may be utilized by using an electric switch, or substituting an electric switch, for the valve construction 76, 80. Such a switch may be closed on the down position of the plunger 74 or equivalent structure and may be opened on the "up" position of such plunger 74. The substituted switch may itself control electric heaters for the oven being controlled or for any other heating system being so controlled. Alternatively, such a switch may in turn control a relay which in turn controls the heaters so described, or a relay gas valve construction.

Descriptions of the circuits of FIGURES 1–6

The electric circuits of FIGURE 1 may be traced from the line L to the connecting pin La of switch 240. The closed contacts 246 and 247 energize the line 246A, light 100 and trunk line L₂A of terminal L₂. The light 100 indicates that the oven is on and is being heated under control of thermostat unit 40 according to the setting of manipulator 42. The failure of the light 110 to be illuminated indicates that the timer control is not being used and is at OFF.

Another circuit of FIGURE 1 may be traced from line L₁ through closed contacts 248, 248', line 248A to closed contacts 318, 320 of upwardly moved switch 94, then through line 260A to oscillating contacts 260, 262 of switch 264, to line 262A oscillating light 98, and line L₂A. The light 98 illuminates when thermostat arm 70 is at or near the selected temperature position, such as 300°, as in FIGURE 23, and extinguishes when the arm 70 is in overshoot, FIGURE 23, undershoot or cold positions, FIGURE 24, as elsewhere explained, in connection with FIGURES 22, 23 and 24. Oscillation of light 98 indicates that the oven temperature is being oscillated back and forth past the selected temperature by the thermostat. The light 98 also remains dark from a cold start until the oven first reaches the selected temperature, nad is ready for the insertion of food in the oven.

In FIGURES 1–6 inclusive, cross hatched circles on certain switch blades, such as the blades having contacts 246, 248 and 250, are intended to indicate diagrammatically that such blades are arrested in their movement so the cooperating contacts, such as 246, 248' and 252 may be separated, to open the circuit at that point. The blades so arrested, however, may have a limited flexing movement, if desired, as is well understood, as long as the respective circuits may be opened at the attached contacts.

The electric circuit for FIGURE 2 may be traced from power line L₁ to La and through closed contacts 246, 247, line 246A, light 100, and line L₂A. Another branch from 246A goes to contacts 312, 310 to light 110 and to line L₂A. Illuminated light 110 indicates that the oven is on, and that it is being automatically controlled by the unit 40 and the timer 86. Light 100 indicates that the oven is being heated under the control of thermostat unit 40.

In FIGURE 2, another branch extends from power line L₁, La, through contacts 248', 248, line 248A, closed contacts 314, 316, line 112A, timer motor 112, and line L₂A. This latter circuit energizes the timer motor 112 to drive the timer knob 88 and switches moved thereby toward the off position 90.

The circuit of FIGURE 3 is the same as FIGURE 2, except that the contacts 306, 308 are closed while the knob 88 is passing through the zone 106. The closing of these contacts causes the buzzer 104 to sound and thus to indicate that the thermostatically and timed controlled operation of FIGURE 2 is about to end, substantially after a fifteen second sounding of the buzzer 104. The buzzer 104 may be of any desired loudness and of any desired tone quality, and it is adapted to be heard readily by the user while in the neighborhood of the kitchen.

The circuit of FIGURE 4 is partially the same as that of FIGURE 2. It is the same insofar as illumination of lights 100 and 110 is concerned, and description of these circuits is not again repeated. The light 98 is intermittently illuminated and darkened under the control of the closing and opening of the switch 264 as the thermostat arm 70 oscillates back and forth over the selected temperature position, such as 300°. This action of switch 264 is more fully described in connection with FIGURES 22, 23 and 24. The oscillating illumination of light 98 is powered from line $L_1$ through contacts 248', 248, line 248A, contacts 220, 218, line 260A, switch 264, line 262A, light 98, and line $L_2A$. The buzzer 104 is intermittently powered in parallel with the light 98, since the line 262A of light 98 is extended at 252B which energizes the closed contacts 326, 328 and line 328A which is connected to the buzzer 104 while the buzzer is also connected on the other side to the line $L_2A$. In this manner, the buzzer 104 is intermittently energized by the opening and closing of the switch 264 as long as the knob 88 of the timer 86 remains in position 108. This is a continuous warning that the higher temperature heating period has terminated, and that a lower temperature heating period will continue until the circuit of FIGURE 4 is altered by the user.

When the timer knob 88 reaches the position 108, as in FIGURE 4, the line 112A is de-energized because all connections with the power contacts 246 and 248 are broken by the upward movement of the switch 94 when the knob 88 reached the position 108.

However, the upward movement of the switch 94 energizes the modifying unit 114. If such unit 114 is a heat motor, the energization takes the form of the energizing of the electric heater 116. Power for the heater 116 is provided from $L_1$, $La$, through contacts 247, 246, line 246A, closed contacts 312, 310, closed contacts 322, 324, line 324A, heater 116, line 116A and line $L_2A$ so the heater 116 is energized.

The energization of the heater 116 causes the arm 118 to be raised, which in turn raises the fulcrum 72 and causes the thermostat unit 40 to operate at a lower or modified condition as long as the knob 88 remains at 108. However, when the knob or manipulator 42 is moved to the off position, the power to the heater 116 is broken at the switch 240 and the timer motor 112 is energized, as shown in FIGURE 5.

The circuit of FIGURE 5 occurs when the manipulator 42 of FIGURE 4 is moved to the off position as in FIGURE 5. This movement may be produced by the user and causes the switch 240 to be moved to the "up" position by the upward movement of the manipulator 42 and pin 182 and this de-energizes contacts 246 and 248 and disconnects all the circuits to the unit 40 and to the lights 98, 100, 110 and to the buzzer 104. This indicates that the thermostat unit 40 has been turned off and that the timer will be or has been automatically turned to off position 90.

The upward movement of the switch 240 closes the contacts 250 and 252 so the line 250A in energized from connector $La$ and the power line $L_1$. The line 250A energizes the closed contacts 300 and 302 which in turn energize the timer line 112A as well as the timer motor 112 which is connected to the line $L_2A$. This causes the timer motor 112 to drive the knob 88 and switches connected thereto from the position 108 to position 90 as soon as the manipulator 42 has been moved to the off position, as shown in FIGURE 5.

In the "timer only" position of FIGURE 6, the timer 86 is used to indicate a selected period of time for the timing of some device or operation other than the thermostat unit 40. The timer knob 88 is set at a selected time above zero, such as at position 2. The timing motor 112 is energized through the closed contacts 250, 252 on the oven switch 240 through energized line 250A, and closed contacts 300 and 302, through the line 112A, timer motor 112 and line $L_2A$. The switch 95 is in the down or closed position at all positions of the pointer 88 of the timer 86, except at the off position 90, at which time the insulator or similar structure 304 of switch 96 is moved to the up dotted line position shown in FIGURE 5 to open the contacts 300 and 302. Therefore, the timer will run from the position 2 to the position 90 where the switch 96 opens. The switch 92 of the timer 86 has its contacts 306 and 308 open at all times of the position of the timer knob 88 from 2 to 90, except while the knob 88 is passing through the zone 106 from the position 102 to the position 107. The switch contacts 306 and 308 of switch 92 move to the closed position during a fifteen second period as the knob passes through the zone 106. The closing of the contacts 306 and 308 energizes the buzzer 104 which will sound during this fifteen second interval. The buzzer may have a buzzing sound, or it may sound a bell intermittently. This will warn of the lapse of the selected time for the operation of any operation other than the oven operation.

*Combined timer and thermostat operation*

The combined timer and thermostat automatic operation is illustrated in FIGURES 2, 3 and 4.

In FIGURE 2, the manipulator 42 has been placed at some on position, such as 300°, and the timer knob 88 has been placed at some interval position, such as 2. This closes the contacts 247–246 and the contacts 248'–248 of switch 240 by the on position of the knob 42. The positioning of the knob 88 at 2 or some other interval position, such as 3 or 4, maintains the contacts 310 and 312 of switch 96 in closed or lower position, which have become live by the closing of the contacts 247 and 246 and this lights and energizes the lights 100 and 110. Also, the contacts 314 and 316 of switch 94 are in closed or lower position while the knob 88 is moving from position 2 to a position just before 108, so the contacts 314 and 316 energize the timer motor 112 to drive the knob 88 from the position 2 to the position just before 108. While the timer knob 88 passes through the zone 106, as illustrated in FIGURE 3, the buzzer 104 is enrgized by the closing of the contacts 306 and 308. The circuit of switch 264 is not operable or energizable during this period, as its circuit is interrupted because of the open contacts 318 and 320 of switch 94 of the timer 86.

When the timer knob 88 reaches the zero position 108, the circuits are energized as shown in FIGURE 4. At this time the switch 94 is moved to the upper position to close the contacts 318 and 320 and also the contacts 322 and 324. The contacts 306 and 308 are opened after the knob 88 has passed the zone 106. The timer motor 112 is de-energized as there is no circuit closed to this motor.

In FIGURE 4, the heat motor 114 is energized to heat the heater 116 and the circuit of the switch 264 and its closed contacts 260 and 262 is energized because of the closing of contacts 326 and 328 of switch 96, as well as the closing of contacts 318 and 320 of switch 94. The energizing of the circuit of switch 264 causes the light 98 to be turned on and off as the arm 70 of the thermostat passes back and forth over the selected temperature level or the upper position of plunger 74, as more fully elsewhere explained in connection with FIGURES 22–24. When the cooking operation has reached the stage of FIGURE 4, the oven should be at the selected temperature or at the upper position of plunger 74 and the switch 264 will be closed, so that the light 98 is energized and the buzzer 104 will be energized through closed contacts 326 and 328. The heat motor 114 throws the thermostat unit 40 to a lower temperature setting as is elsewhere described and in so doing it throws the thermostat arm 70 into "overshoot." This opens the switch 264 so current to the light 98 and the buzzer 104 is momentarily interrupted. The momentary signals from the light 98 and the buzzer 104 combined with the previous fifteen second operation of the buzzer 104 combine to warn the user that the dinner will be complete in about 20 to 30 minutes. This allows time to perform the finishing touches for the dinner. When the oven cools to the fixed lower temperature, the switch 264 will come out of "overshoot" and will close and will complete circuits to the light 98 and to the buzzer 104. This tells the user that the operation has been completed and that the dinner is ready. The timer will remain at zero and the oven temperature will remain at the reduced level caused by the heat motor 114 until the thermostat knob is turned to the off position.

The continued intermittent actuation of light 98 and buzzer in FIGURE 4 warns the user that eventually the thermostat manipulator 42 should be turned off.

At the thermostat manipulator 42 off position the timer will clear itself and the knob 88 will move to off position 90 through the closing of contacts 250 and 252 of switch 240. The operation of the timer motor 112 will be stopped when the switch 96 is pushed by the timer to the open or top position, as indicated in dotted lines in FIGURE 4.

The next time the thermostat knob 42 is turned on, it will be a manual operation, as shown in FIGURE 1, and the operation will be as shown in FIGURE 1, unless the knob 88 is again also turned to some timing position, such as 2 of FIGURE 2.

If the thermostat unit 40 is provided with a return motor for returning the knob 42 to the off position by the energization of a circuit corresponding to the circuit of heater 116, then the thermostat unit 40 will be turned to the off position by the motor, to the positions shown in FIGURE 5, and the timer 86 will be energized until such time as the knob 88 is in the position 90, at which time the timer will turn itself off by moving the contacts of switch 96 to the dotted line "open" position.

However, if the heating unit 114 is being used as in the operation just previously described, the timer 86 will be driven by the closed contacts 252 of switch 240 when the manipulator 42 is turned manually by the user to the off position and this will energize the motor 112 to drive the knob 88 to the off position 90, at which time the timer will move the switch 96 to the up position and so de-energize itself by stopping the motor 112.

*The timer construction*

Figure 25:
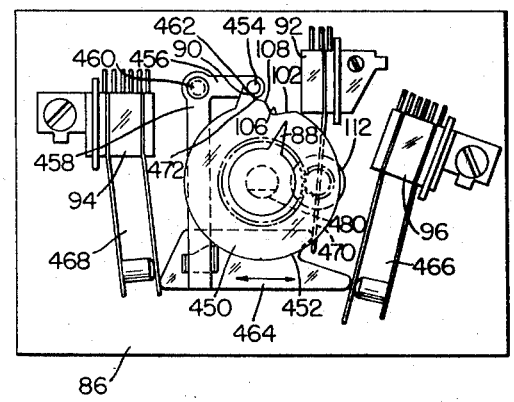
FIGURE 25 is an end view of a suitable cam for the timer, the switches operated thereby, and the linkage used to operate the switches.
Figure 26:
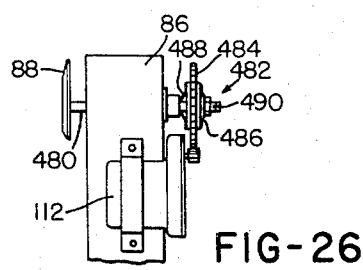
FIGURE 26 is a diagrammatic side view of the timer and the driving motor therefor.
Figure 27:
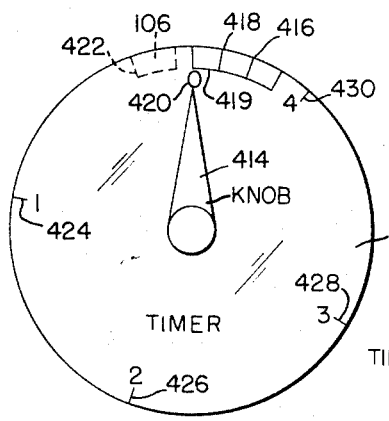
FIGURE 27 is a diagrammatic representation of a timer knob of another embodiment.

FIGURES 25 and 26 show diagrammatically details of the timer construction.

FIGURE 25 shows diagrammatically the knob 88 of the timer 86, with the diagrammatic cam construction 450 movable therewith in fixed relation. The cam construction 450 may be a single cam or a plurality of cams, which is capable of producing the relative movements shown in FIGURES 1 to 6 between the knob 88 and the switches 92, 94 and 96. Any suitable type of timer construction may be used that produces this result.

For example, a single cam 450 may be used which has a peripheral surface 452 which actuates the roller 454 and the bell crank 456, 458 which is pivoted about the fulcrum 460.

The knob 88 and cam 450 are fixedly secured to the rotatable shaft 480.

When the roller 454 is riding on the surface 452, which is a position not illustrated in FIGURE 25, then the arm 458 is slightly to the left of the position shown in FIGURE 25. The switch is in the off position 90, in FIGURE 25. The knob 88 is shown in the off position in FIGURE 25, which corresponds to position 90 in FIGURE 1. The roller 454 is riding on the periphery at a point which is the highest that the roller 454 is normally moved. This is the greatest radius distance used from the center of cam shaft 480.

With the knob at the position illustrated in FIGURE 25, and with the roller 454 near the top of the "hump" 462, the pushing member 464, which is moved by arm 458, has pushed the arms 466 of the switch 96 sufficiently far to the right so that the arms 466 cause the switch 96 to be in the up position shown in FIGURE 1. Under these conditions the switch 96 stops the timer motor 112.

When the knob 88, in FIGURE 25, is moved counterclockwise to some such position as 2, as indicated in FIGURE 2, the cam 450 likewise is moved counterclockwise, from the position of FIGURE 25, so that the periphery 452 is placed under the roller 454 to move the roller 454 to a lower position, and to cause the arm 458 to move leftward along with the pusher 464. This moves the arms 466, 468 and 470 of switches 92, 94 and 96 all leftward, to cause the switches 92, 94 and 96 of FIGURE 25 to produce the switch positions of switches 92, 94 and 96, of FIGURE 2, in which FIGURE 2 all of these switches are in the down or normal position.

The knob 88 and cam 450 then begin to be driven clockwise under the driving action of timer motor 112 until the knob 88 reaches the zone 106, as shown in FIGURE 3. When the knob has moved to this position of FIGURE 3, then the cam 450 of FIGURE 25 has moved, so that the low surface or zone 106 of the cam 450 is under the roller 454. The arm 458 is then in its most leftward position zone, which moves the arms 466, 468 and 470 to their most leftward position zone. The switches 94 and 96 are not altered by this motion, but the switch 92 is changed to the closed position of contacts 306 and 308, as shown in FIGURE 3, so the buzzer 104 is sounded, during the passage of knob 88 through zone 106.

When the knob 88 reaches the position 108, of FIGURE 4, then the cam 450 places the surface 472 under the roller 454, which moves the arm 458 and pusher 464 rightward from the position they had when the roller 454 was over the low valley 106 of the cam 450. The radii of surface 472 are greater than the radius of cam surface 452. This moves the arms 466, 468 and 470 slightly rightward beyond the positions which they had when the roller 454 was riding on the surface 452. The pusher 464 then moves the arms 466, 468 and 470 to a position such that the switches 92, 94 and 96 have the position of FIGURE 4, wherein the switch 94 is in up position, and the switches 92 and 96 are in the down position. This produces the action elsewhere described in connection with FIGURE 4.

When the thermostat manipulator 42 is moved to the off position, as shown in FIGURE 5, then the timer motor 112 drives the knob 88 and cam 450 so the knob 88 starts to move rightward toward the position 90. The cam 450 moves slightly clockwise in FIGURE 25, so that the roller 454 starts to move up the incline of the hump 462 toward the position 90. During this time the motor 112 is energized to drive the cam 450 until the cam surface 90 raises the roller 454 sufficiently high so the pusher 464 is moved rightward and the arms 466 also are moved rightward a sufficient distance to cause the switch 96 to assume the off position of FIGURE 1. The switch 96 is in the up position to produce the conditions wherein both the manipulator 42 and the knob 88 are in the off position, with the entire system de-energized.

The switches 92, 94 and 96 illustrated in FIGURE 25 may be of any desired type capable of producing the contact positions described in connection with FIGURES 1–6. Such switches may be slow make and break type, or of the snap acting type. They may be actuated by the levers 466, 468 and 470 to produce the desired contact conditions. Switches of this type are well known and are produced by switch manufacturers according to the requirements of the user.

FIGURE 26 shows a diagrammatic side view of the timer of FIGURE 25 in greatly reduced scale. The body of the switch is indicated at 86 in FIGURE 26, with the knob 88 on driving the shaft 480, which is fixed to the knob 88, and to the cam 450 of FIGURE 25. The construction is such that movement of the knob 88 causes an equal movement of the cam 450, and shaft 480.

A slip clutch or the like 482 produces a slip action between the gear wheel 484 and the shaft 480. The gear wheel 484 is loosely mounted on shaft 480. The knob 488 and cam 450 may be rotated by the user without necessarily causing any rotation of the motor 112. This is particularly advantageous where there is a large gear reduction between the rotation of the motor 112 and the shaft 480.

By way of example, the spring discs or fingers 486 and 488 are fixed to the right end 490 of the shaft 480 but have a slipping engagement with the sides of the loosely mounted gear 484, so that the shaft 480 may be rotated along with the spring discs 486 and 488, without necessarily rotating the gear 484 and the motor 112. Any other type of slip clutch construction may be used for this purpose.

This type of construction permits the user to rotate the knob 88 and cam 450, counterclockwise in FIGURES 1 and 25 quickly and without necessarily rotating the motor 112. Thereafter, the motor 112 may drive the gear 484 and shaft 480 clockwise in FIGURES 1 and 25 through reduced speed gearing and through the slip clutch 488 to return the knob 88 and cam 450 to or toward the off position 90 as elsewhere described. The relatively low torque required to rotate the shaft 480 permits the motor 112 to drive the shaft 480 through the slip clutch 488 except when opposed by manual actuation of the knob 88, or when stopped in the off position 90 by the hump 462 of FIGURE 25.

Figure 33:
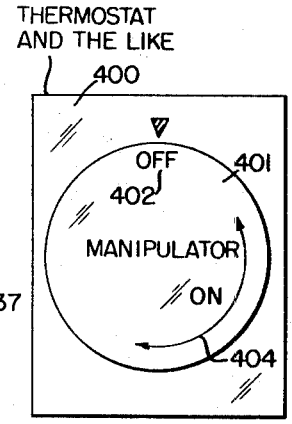
FIGURE 33 is a diagrammatic illustration of a manipulator for a unit to be used with the timer of FIGURES 27–32.

FIGURES 27 through 33 show a simplified diagram and embodiment in which a unit 400 of any kind, such as the thermostat unit 40 heretofore described, may have a unit manipulator 401 with an off position 402, FIGURE 33, and one or more on positions 404, such as manipulator 42.

Figure 28:
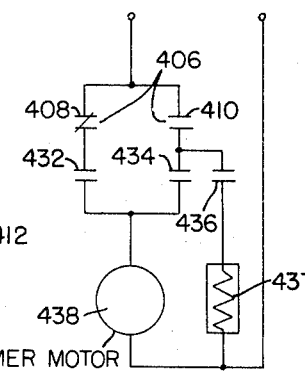
FIGURE 28 is a wiring diagram of a system with the timer knob of FIGURE 27.
Figure 29:
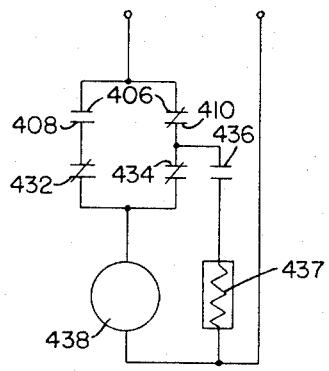
FIGURES 29–32 are wiring diagrams similar to FIGURE 28, showing other stages during the travel of the timer knob of FIGURE 27.

The switch means 406, FIGURE 28 (such as switch 240 of FIGURE 1), is operated by movement of the manipulator 401, FIGURE 33, from said on position 404 to said off position 402. The switch means 406 in FIGURE 28 has a first switch 408 closed (diagonal lines across the switches indicate closed condition) when said manipulator 401 is in off position 401. A second switch 410, FIGURE 28, is open (with no diagonal line crossing it) when said manipulator is in the off position 402. The first switch 408, FIGURE 29, is open and said second switch 410 is closed when said manipulator 401 is in the on position 404.

A timer 412 has a knob 414 with an off position 416 and a plurality of on positions 418, 420, 422, 424, 428 and 430.

Figure 30:
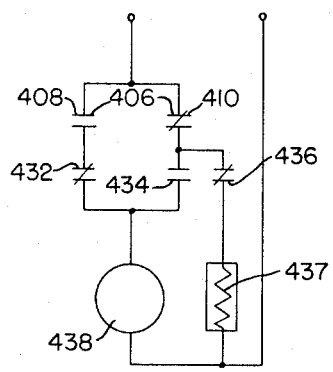

Third, fourth and fifth timer switches 432, 434 and 436 respectively, FIGURES 28–32, are provided for the timer 412 and they are actuated by a switch actuating means in the timer 412, not shown, to operate the switches 432, 434 and 436 in accordance with the positions of the knob 414. A timer return motor 438 returns the knob 414 from any of said on positions toward and to said off position 416, in a manner similar to that disclosed in FIGURES 25 and 26. The knob 414 is manually movable from said off position 416 to a unit modifying position 420 and to a normal zone of timed normal unit operation which may include all positions counterclockwise of position 416 and on through to position 430. A modifying circuit including member 437 is in modifying condition, as shown in FIGURE 30, when the knob 414 is in modifying position 420. The circuit is in non-modifying condition at all other knob positions outside of the zone produced by positions 418 and 420, such zone being indicated by the reference numeral 419.

In FIGURE 28, the timer knob 401 is at 416. The thermostat dial is at off. The timer motor 438 is de-energized. The circuit including member 437 is denergized.

In FIGURE 29, at the start of the timed operation, the thermostat dial 412 is at on. The timer knob 414 is in zone 420–430. The timer motor 438 is operating. The auxiliary circuit 437 is deenergized.

In FIGURE 30 at the elapsed time position, the thermostat dial 401 is on. The timer knob is at zero i.e., 420. The timer motor is de-energized. The auxiliary circuit 437 is energized.

Figure 31:
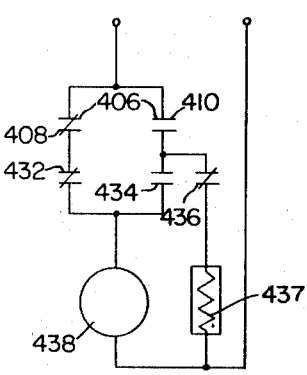

In FIGURE 31, the operation is complete. The timer knob is at zero, i.e., 420. The thermostat dial 401 is at off. The timer motor 438 is operating. The auxiliary circuit is de-energized.

Figure 32:
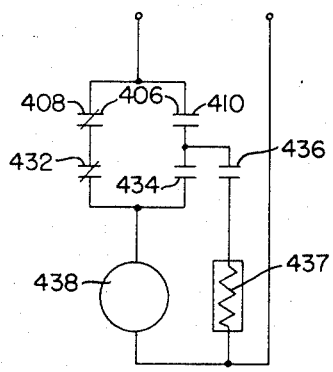

In FIGURE 32 the timer knob is clearing, i.e., is returning to 416. The timer knob is at 418. The thermostat dial 401 is off. The timer motor 438 is operating. The auxiliary circuit is de-energized.

The combined operation with the manipulator 401 in the on position 404 and with knob 414 in the normal zone from just counterclockwise of 420 and on through to 430 actuates the switches to cause the unit 400 to operate in normal unit operation and cause the knob 414 to be moved or returned by timer motor 438 to said unit modifying position 420 where the unit 400 is modified and is maintained modified between positions 420 and 418.

The timer knob 414 is operated and moved by the timer motor 438 to the off position 416 from any of the positions 420 to 418 when the unit manipulator 401 is moved to the manipulator off position 402.

If desired, in the construction of FIGURES 27 through 33, the unit 400 being controlled an which has the manipulator 401 may be modified by automatically driving the manipulator 401 from the on position or position 404 to the off position when the timer knob 414 reaches the modifying position 420.

The invention disclosed in FIGURES 27 through 33 incorporates an electrically driven timer 412 with attached switches 432, 434 and 436 in a fixed relation to the timer knob 414. The timer switches 432, 434 and 436, are indicated variously in open and closed position in FIGURES 28 through 32 being closed when a diagonal line crosses them and being open wihen there is no diagonal line. The timer knob 414 can be manually set to any position counterclockwise from the off position 416. When energized, the timer motor 438 will drive the knob 414 from a high to a lower indicated position.

A single pole, double throw switch 406 that works in conjunction with the unit 400 such as an oven thermostat is another component of this invention. This switch is indicated at 406 by contacts 408 and 410.

FIGURE 28 shows the switch contacts 432, 434, 436 in their off position 416. Any time the unit or thermostat manipulator 401 is turned to the off position, the system will return to this position 416.

This invention is operated by turning the unit or thermostat manipulator 401 to on position 404 while the timer knob 414 is turned to some position above the counterclockwise to 416. The contacts then assume the positions shown in FIGURE 29, and the timer motor 438 operates to move the knob 414 toward 0 or 418. The auxiliary function circuit 437 is not energized at this time because of open switch 436.

The timer moves from the selected position to 0 time 420 where the timer motor 438 is de-energized by open switches 408 and 434 as the contacts assume the position shown in FIGURE 30. Contact 436 is shown to close at this elapsed time position. Contact 436 could be closed at some position above the 0 position 420 if it is desired. This closed contact 436 energizes an auxiliary circuit 437 that could be used for a signal, a complete interruption of oven heat, or a reduction in oven heat. The timer knob 414 stays at 0 to 420 and the contacts stay as shown in FIGURE 30 until the operation is complete and the unit manipulator 401 is turned to the off position 402. The manipulator 401 may be turned to the off position manually by the user, or alternatively by a return motor, not shown, on manipulator 401. Contact 408, FIGURE 31, then closes to re-energize the timer motor 438 through contact 432, as shown in FIGURE 31.

Contact 436 opens at the timer dial position 418, FIGURE 32, to interrupt the auxiliary function circuit 437 as the timer clears itself as it is moving toward position 416, as shown in FIGURE 32.

The timer motor runs until the knob returns to the off position 416 where the contact 432 opens, as shown in FIGURE 28. The system has then cleared or de-energized itself. When the thermostat or unit is used again, the timer and the timer holding circuit will not operate unless it is reset to some position counterclockwise from position 416.

If the timer 414 is set to an operating position above or counterclockwise from position 416, without turning the thermostat or unit manipulator 401 to the on position 404, the timer will return to its off position 416 and perform a timing operation entirely independent of the unit or thermostat which is controlled by the manipulator 401.

In order to obtain an alternate type of operation, contact 408 could be a single pole, single throw switch working in conjunction with the thermostat dial 401. This switch 408 would close only when the thermostat was turned to the off position 402. This position is identical to that previously described for contact 408. Contact 410 can be a separate switch from contact 408. The most likely possibility would be to use a "ready" switch for contact 410. This switch 410 would close only when controlled temperature has reached the indicated temperature of the thermostat manipulator 401, and would open at the thermostat off position 402. This alternate system would then allow the timer motor to start only after the controlled temperature had reached its set point. This differs from the previously described system where the timer motor was energized by turning the dial counterclockwise above position 416.

One timer of the type described above could be used in conjunction with more than one thermostat. This would be done by means of a selector switch that would disconnect one thermostat while connecting another.

The system described in this disclosure would clear itself only in the event that the thermostat or timer were turned to off. Once the system has started to automatically reduce temperature, it is necessary to turn the thermostat off before it is possible to perform another cooking or baking operation. This operation is less complicated than conventional clock systems where it is necessary not only to perform the usual operation of turning the thermostat off, but the clock must also be reset to "manual."

It is to be noted that thermostat arm 70 may be provided with downward bulges 72A, FIGURE 7, to rock on the upper surface of fulcrum disc 72.

It is thus to be seen that a relatively simple and efficient system has been provided and that relatively simple components which may be used in such a system have also been provided.

A relatively simple and efficient thermostat unit 40 has been provided. This unit may include modifying components which may be added to or omitted from the thermostat unit as required by the purchaser. One of these modifying components may be, for example, a temperature setting modifier which may be electrically energized and may be a heat pump, solenoid construction, and the like. Another of these modifying components may be a manipulator return motor and the like which may be provided with or omitted from the thermostat unit. Both the temperature setting modifier and the manipulator return motor may be provided on the same thermostat unit and a two way selector switch may be included in the modifier electric circuit 324A and 116A of FIGURE 4 so the user may selectively choose whether the temperature setting modifier 114 shall operate during a given cooking operation to reduce or increase the temperature or whether the manipulator return motor shall operate completely to de-energize both the thermostat unit and the timer unit 86 with which the thermostat unit may be connected.

The thermostat unit 40 is so constructed that it may cause thermostatically controlled operation of the gas burning elements of the oven 30 whether the electric power is available or not. The oven may be thermostatically controled even when there is an electric power failure due to a storm and the like.

The thermostat unit 40 may also be provided to a customer with or without the switches 240 and 264, depending on whether the customer desires to use or omit the timer 86 in his equipment.

The timer 86 may be used to control or indicate the operation of the thermostat unit 40, or to indicate the period of operation of any other unit or device which may be operable in the neighborhood of the timer unit 86.

These and many other advantages have thus been provided by this invention.

While the form of the invention now preferred has been disclosed as required by the statutes, other forms may be used, all coming within the scope of the claims which follow.

What is claimed is:

1. In combination: a main gas burner; a main burner gas feed pipe for said main gas burner; a pilot burner to ignite said main gas burner; a pilot gas feed pipe to feed pilot gas to said pilot burner; an operationally fixed gas control to feed a relatively constant pilot gas supply to said pilot gas feed pipe to produce a relatively small pilot flame; an operationally variable pilot gas control to feed pilot gas to said pilot gas feed pipe to produce a relatively large pilot flame; an on-and-off gas control valve controlling said main burner gas feed pipe when open to feed and when closed to stop the feed of main burner gas to said main gas burner; and thermostatic means responsive to said relatively large pilot flame to open said on-and-off gas control valve when said relatively large pilot flame is burning and to close said on-and-off gas control valve when said relatively large pilot flame is not burning, said operationally variable pilot gas control comprising a housing having lever means fulcrumed therein, said housing having a valve means operated by said fulcrumed movement of said lever means, said valve means being adapted to feed said pilot gas to produce said large heater flame only when said valve means is open, said housing having manual manipulator means to adjust the fulcrum point of said lever means relative to said valve means to preselect the opening and closing conditions for said valve means.

2. A combination according to claim 1 in which said housing has a temperature responsive device acting on one end of said lever means to fulcrum said lever means in response to temperature sensed by said device whereby said operationally variable pilot gas control is thermostatically responsive to temperatures created by said main gas burner.

3. A combination according to claim 1 in which a safety valve is provided for said pilot gas feed pipe which automatically remains open as long as said pilot burner is ignited and which automatically closes when said pilot burner is not ignited.

4. A combination according to claim 3 in which said safety valve has manual means for holding said safety valve open to ignite said pilot burner.

5. In combination: a main gas burner construction; main burner gas feed means for said construction; single pilot burner means to ignite said main gas burner construction; pilot gas feed means to feed gas to said pilot burner means; operationally fixed pilot gas control means to feed pilot gas to said pilot gas feed means and to produce a single low flame pattern; an operationally variable pilot gas control to feed pilot gas to said single pilot burner means to increase said pattern to high flame pattern; a main gas burner gas control means feeding burner gas to said main gas burner construction when open and stopping the feed of burner gas to said main gas burner construction when said main gas burner gas control means are closed; and thermostatic means responsive to operation of said relatively high flame pattern to close said burner gas control means when said relatively high flame pattern is not produced and to open said burner gas control means when said relatively high flame pattern is produced, said operationally variable pilot gas control comprising a housing having lever means fulcrumed therein, said housing having a valve means operated by said fulcrumed movement of said lever means, said valve means being adapted to feed said pilot gas to produce said large heater flame only when said valve means is open, said housing having manual manipulator means to adjust the fulcrum point of said lever means relative to said valve means to preselect the opening and closing conditions for said valve means.

6. A combination according to claim 5 in which said housing has a temperature responsive device acting on one end of said lever means to fulcrum said lever means in response to temperature sensed by said device whereby said operationally variable pilot gas control is thermostatically responsive to temperatures created by said main gas burner.

7. A combination according to claim 5 in which safety valve means causes said pilot gas feed means to feed pilot gas as long as said pilot burner means is ignited and to stop the feed of pilot gas when said pilot burner means is not ignited.

8. A combination according to claim 7 in which manually operable means are provided to feed gas to said pilot burner means when not burning to ignite said pilot burner means.

9. In combination: a main gas burner; a main burner gas feed means for said main gas burner; a pilot burner to ignite said main gas burner; a pilot gas feed means to feed pilot gas to said pilot burner; means to feed pilot gas to said pilot burner at a rate to produce a relatively small pilot flame pattern; an operationally variable pilot gas control to feed pilot gas to said pilot burner at a rate to produce a relatively large flame pattern; a thermostatic main burner gas control valve controlling the feed of burner gas to said main gas burner; and thermostatic means responsive to said relatively large pilot flame pattern to cause said thermostatic valve to feed burner gas to said main gas burner, said thermostatic means causing said thermostatic valve to stop the flow of burner gas to said main gas burner when said large pilot flame pattern is not burning, said operationally variable pilot gas control comprising a housing having lever means fulcrumed therein, siad housing having a valve means operated by said fulcrumed movement of said lever means, said valve means being adapted to feed said pilot gas to produce said large heater flame only when said valve means is open, said housing having manual manipulator means to adjust the fulcrum point of said lever means relative to said valve means to preselect the opening and closing conditions for said valve means.

References Cited

UNITED STATES PATENTS

| | | | |
|---|---|---|---|
| 2,483,191 | 9/1949 | Gauger | 158—117.1 |
| 2,676,757 | 4/1954 | Thornbery | 158—131 X |
| 2,939,523 | 6/1960 | Ray | 158—131 |
| 3,090,560 | 5/1963 | Holzboog et al. | 236—68 |
| 3,112,790 | 12/1963 | Fredrick | 158—131 |

ROBERT A. O'LEARY, *Primary Examiner.*

W. E. WAYNER, *Assistant Examiner.*